United States Patent [19]

Sasaki et al.

[11] Patent Number: 5,129,288
[45] Date of Patent: Jul. 14, 1992

[54] TRANSMISSION CONTROL SYSTEM FOR AUTOMATIC TRANSMISSION

[75] Inventors: Kazuo Sasaki; Minoru Kuriyama; Ikuo Onimura, all of Hiroshima, Japan

[73] Assignee: Mazda Motor Corporation, Hiroshima, Japan

[21] Appl. No.: 588,988

[22] Filed: Sep. 27, 1990

[30] Foreign Application Priority Data

Sep. 29, 1989 [JP] Japan ................. 1-254816
Dec. 14, 1989 [JP] Japan ................. 1-325367

[51] Int. Cl.$^5$ ................. B60K 41/08; B60K 41/06
[52] U.S. Cl. ................. 74/866; 364/424.1
[58] Field of Search ................. 74/866; 364/424.1

[56] References Cited

U.S. PATENT DOCUMENTS

| | | | |
|---|---|---|---|
| 4,523,281 | 6/1985 | Noda et al. | 74/866 X |
| 4,669,335 | 6/1987 | Matsuoka et al. | 74/866 |
| 4,737,915 | 4/1988 | Hosaka | 74/866 X |
| 4,793,217 | 12/1988 | Morisawa et al. | 74/866 |
| 4,796,489 | 1/1989 | Nagamatsu et al. | 74/868 X |
| 4,875,892 | 10/1989 | Sueda | 74/865 X |
| 4,996,893 | 3/1991 | Nakamura et al. | 74/866 |
| 5,005,442 | 4/1991 | Sakakibara et al. | 74/866 |
| 5,022,285 | 6/1991 | Suzuki | 74/866 |
| 5,031,100 | 7/1991 | Takahashi | 74/866 X |
| 5,035,160 | 7/1991 | Morita | 74/866 |

FOREIGN PATENT DOCUMENTS 4006451 9/1990 Fed. Rep. of Germany .
51-22698 7/1976 Japan .
57-8983 2/1982 Japan .

Primary Examiner—Leslie A. Braun
Assistant Examiner—David E. Henn
Attorney, Agent, or Firm—Sixbey, Friedman, Leedom & Ferguson

[57] ABSTRACT

A transmission control system for an automatic transmission for a vehicle causes the automatic transmission to shift according to one of an economy mode shift pattern and a power mode shift pattern. The control system switches the shift pattern from the economy mode shift pattern to the power mode shift pattern when the engine load or the rate of change of the engine load becomes not smaller than a predetermined reference value. The predetermined reference value is changed according to the acceleration of the vehicle body.

8 Claims, 11 Drawing Sheets

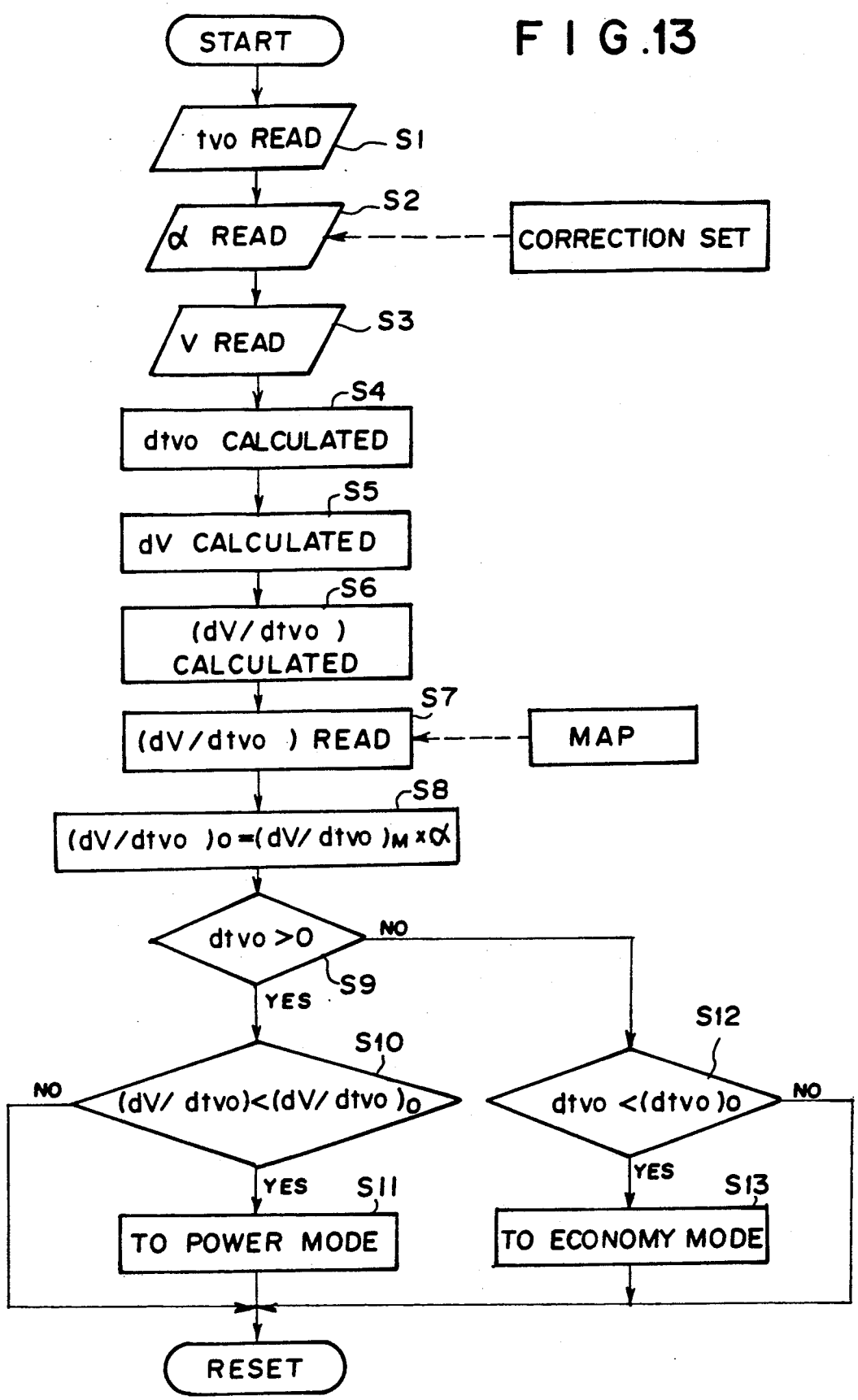

TRANSMISSION CONTROL SYSTEM FOR AUTOMATIC TRANSMISSION

BACKGROUND OF THE INVENTION

1. Field of the Invention

The invention relates to a transmission control system for an automatic transmission.

2. Description of the Prior Art

Recently, in many of automatic transmissions for a vehicle, the shift pattern can be changed. For example, an economy mode shift pattern and a power mode shift pattern in which shift lines are shifted toward the high vehicle speed side as compared with the economy mode shift pattern are prepared, and one of the shift patterns can be manually selected.

Further there has been proposed an automatic transmission in which one of a plurality of shift patterns is automatically selected on the basis of the engine load. For example, in the automatic transmission disclosed in Japanese Patent Publication No. 57(1982)-8983, the automatic transmission normally shifts according to an economy mode shift pattern, and when the engine load exceeds a predetermined reference value, e.g., the value corresponding to the throttle opening of ¾, the automatic transmission shifts according to a power mode shift pattern. That is, it is considered that the engine load is heavier than the reference value means a large engine output power requirement, and the power mode shift pattern is automatically selected.

In the automatic transmission disclosed in Japanese Patent Publication No. 51(1976)-22698, the shift pattern is changed to the power mode shift pattern when the accelerator pedal is abruptly pushed down, that is, when the rate of change of the engine load exceeds a predetermined reference value.

However, in the automatic transmissions disclosed in the patent publications described above, an optimal shift pattern cannot be always selected since the reference values are fixed.

That is, in the case of the automatic transmission disclosed in Japanese Patent Publication No. 57(1982)-8983, when the vehicle cruises at a constant speed under engine load slightly heavier than the reference value, the power mode shift pattern will be selected though the economy mode shift pattern is preferred in view of fuel economy. On the other hand, when the accelerator pedal is pushed down with intention of accelerating the vehicle while the vehicle is cruising at a constant speed under engine load which is substantially lighter than the reference value, the shift pattern is kept the economy mode shift pattern until the engine load exceeds the reference value and accordingly, the vehicle cannot be sufficiently accelerated.

In the case of the automatic transmission disclosed in Japanese Patent Publication No. 51(1976)-22698, proper acceleration for the load on the vehicle, the inclination of the road, or the like cannot be obtained since the shift pattern is switched solely depending upon the rate of depression of the accelerator pedal. For example, the driver is apt to largely push down the accelerator pedal before an ascending slope without intention of accelerating the vehicle, and in such a case, the shift pattern is switched to the power mode shift pattern against his will.

SUMMARY OF THE INVENTION

In view of the foregoing observations and description, the primary object of the present invention is to provide a transmission control system for an automatic transmission which can more properly selecting the shift pattern.

In accordance with the present invention, there is provided a transmission control system for an automatic transmission for a vehicle which causes the automatic transmission to shift according to one of first and second shift patterns, the transmission being caused to upshift into a given gear-speed at a lower vehicle speed according to said first shift pattern than according to said second shift pattern, characterized in that the shift pattern is switched between the first and second shift patterns on the basis of a combination of a function of engine load and a function of acceleration of the vehicle body.

In this specification, the expression "function of engine load" should be broadly interpreted to include all the functions of the engine load itself and of various values derived from the engine load, e.g., the rate of change of the engine load.

In accordance with one aspect of the present invention, the transmission control system switches the shift pattern from the first shift pattern to the second shift pattern when the engine load or the rate of change of the engine load becomes not smaller than a predetermined reference value, and the predetermined reference value is changed according to the acceleration of the vehicle body.

In accordance with another aspect of the present invention, the transmission control system switches the shift pattern from the first shift pattern to the second shift pattern when the ratio of the acceleration of the vehicle body to the rate of change of the engine load becomes smaller than a predetermined reference value.

In accordance with still another aspect of the present invention, the throttle opening and the actual acceleration of the vehicle body are detected and the actual acceleration of the vehicle body is compared with a reference value for the throttle opening, a running load is determined according the result of the comparison and when the running load is larger than a preset value, the shift pattern is switched from the first shift pattern to the second shift pattern.

Since the shift pattern is switched taking into account the actual acceleration of the vehicle body, the chance that the shift pattern is changed against the driver's will is minimized.

BRIEF DESCRIPTION OF THE DRAWINGS

FIG. 13 is a flow chart for illustrating the control that the transmission control unit executes in a second embodiment of the present invention.

DESCRIPTION OF THE PREFERRED EMBODIMENTS

Figure 1:
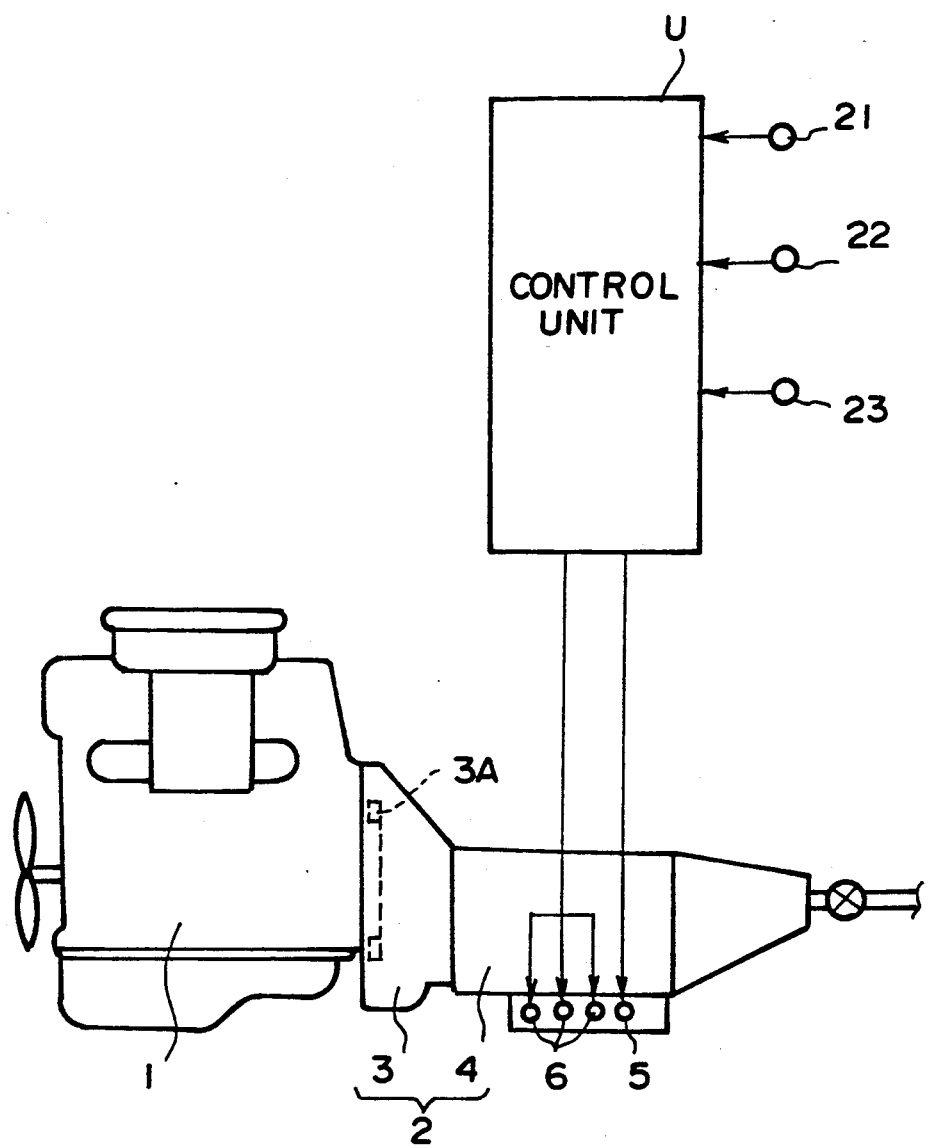
FIG. 1 is a schematic view showing an automatic transmission provided with a transmission control system in accordance with the present invention.

In FIG. 1, output power of an Otto engine 1 is transmitted to driving wheels (not shown) by way of an automatic transmission 2.

The automatic transmission 2 comprises a torque converter 3 having a lockup clutch 3A and a transmission gear mechanism 4 having four forward speeds and a reverse speed. The automatic transmission 2 is driven by a hydraulic circuit (not shown) and the lockup clutch 3A is applied and released by energizing and de-energizing a lockup solenoid 5 incorporated in the hydraulic circuit. The transmission gear mechanism 4 is shifted by selectively energizing and de-energizing a plurality of solenoids 6 incorporated in the hydraulic circuit.

Figure 2:
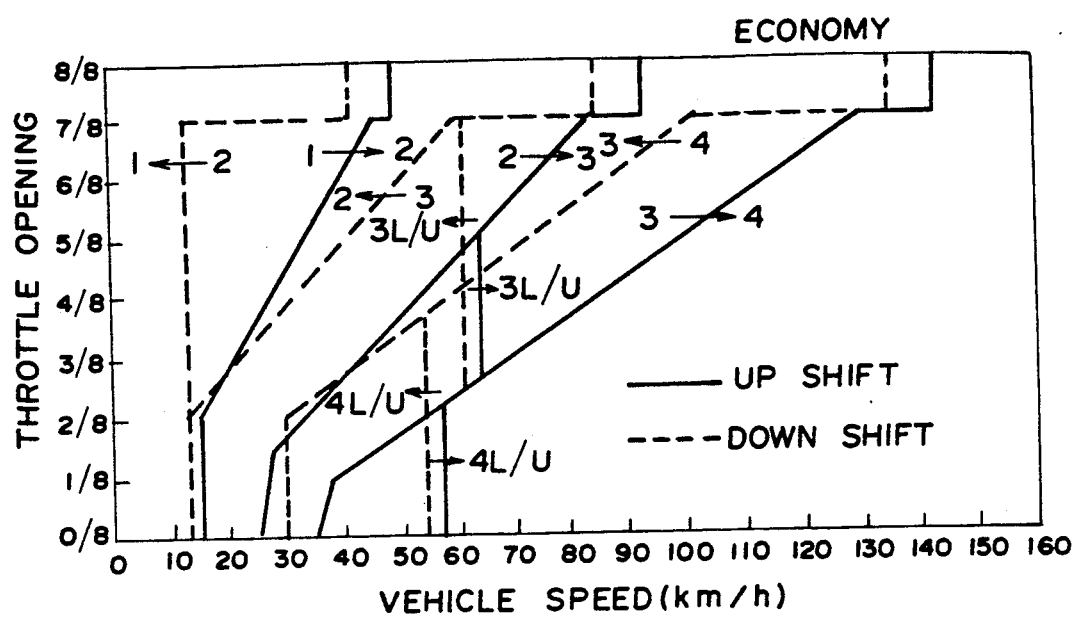
FIG. 2 is a view showing an example of an economy mode shift pattern.
Figure 3:
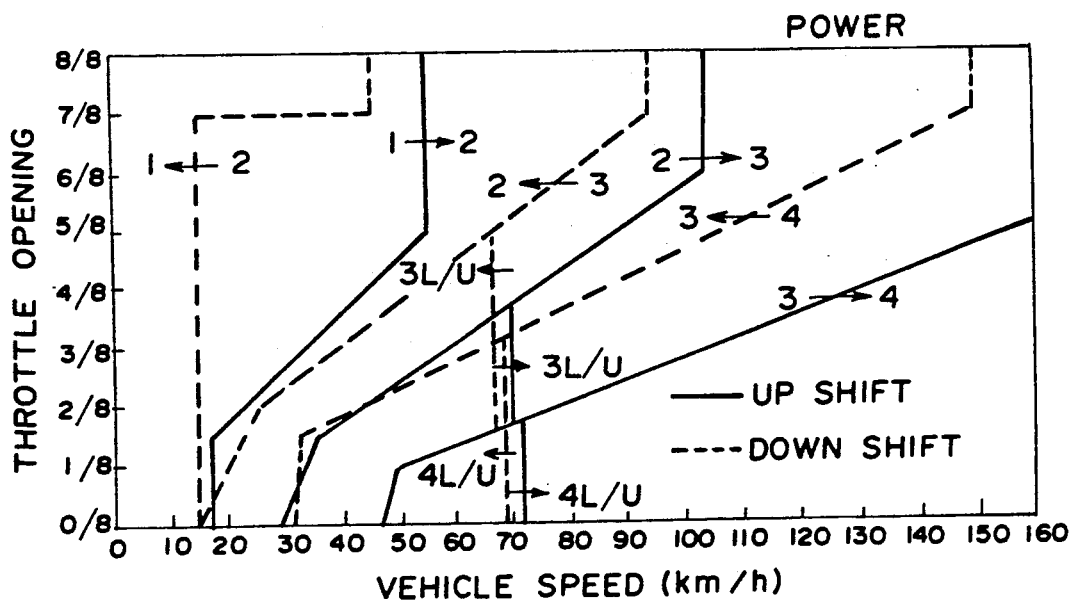
FIG. 3 is a view showing an example of a power mode shift pattern.

In FIG. 1, U denotes a transmission control unit comprising a microcomputer. The transmission control unit U receives signals from a throttle opening sensor 21, a vehicle speed sensor 22 and a mode selecting switch 23, and outputs a signal to the solenoids 5 and 6. The mode selecting switch 23 is manually operated to select one of an economy mode, a power mode, an automatic switching mode and a holding mode. When the economy mode is selected, the automatic transmission 2 is shifted according to the economy mode shift pattern shown in FIG. 2, when the power mode is selected, the automatic transmission 2 is shifted according to the power mode shift pattern shown in FIG. 3, when the automatic switching mode is selected, the shift pattern is automatically switched between the economy mode shift pattern and the power mode shift pattern, and when the holding mode is selected, the gear-speed is fixed to third, second or first according to the position of the selector lever of the automatic transmission 2. The present invention relates the control of the automatic transmission 2 when the automatic switching mode is selected. If desired, the present invention may be applied so that the shift pattern is automatically switched between the economy mode shift pattern and the power mode shift pattern when the economy mode is selected.

First it is assumed that the automatic switching mode has been selected by means of the mode selecting switch 23. When the automatic switching mode has been selected, the automatic transmission 2 is basically shifted according to the economy mode shift pattern shown in FIG. 2, and when the throttle opening (engine load) becomes not smaller than a predetermined reference value, the shift pattern is automatically switched from the economy mode shift pattern to the power mode shift pattern and the automatic transmission 2 is shifted according to the power mode shift pattern.

Figure 4:
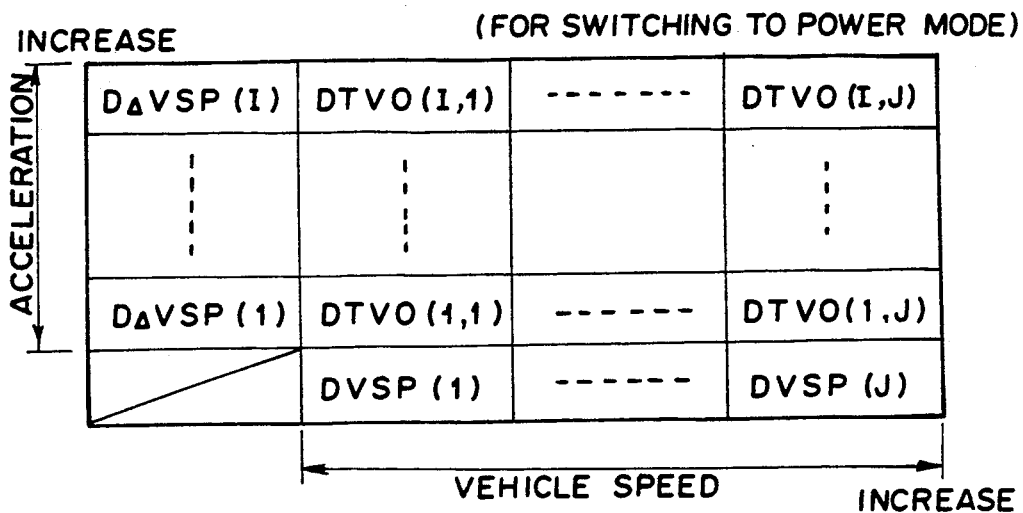
FIG. 4 is a map of reference values for switching the shift pattern to the power mode shift pattern.
Figure 6:
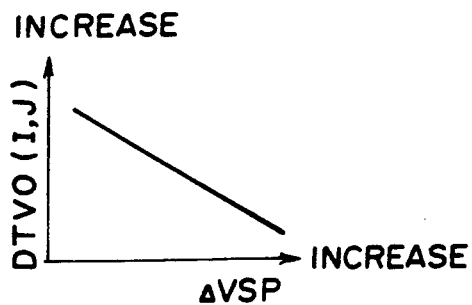
FIG. 6 shows the relation between the vehicle body acceleration and the reference value in the map shown in FIG. 4 when the vehicle speed is fixed.
Figure 7:
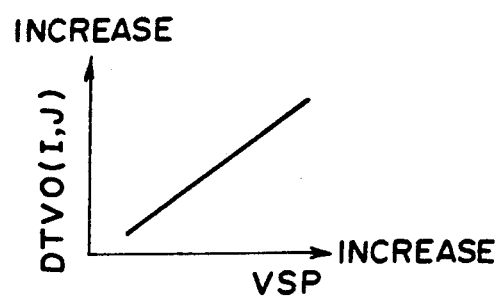
FIG. 7 shows the relation between the vehicle speed and the reference value in the map shown in FIG. 4 when the vehicle speed acceleration is fixed.

The predetermined reference value is determined according to a map shown in FIG. 4 in which the predetermined reference value is set as a function of the vehicle body acceleration $\Delta VSP$ and the vehicle speed VSP. In FIG. 4, the vehicle speed as the parameter is denoted by DVSP(J) (J stands for 1, 2 ...), the vehicle body acceleration as the parameter is denoted by the D$\Delta$VSP(I) (I stands for 1, 2 ...), and the predetermined reference value (the throttle opening) is denoted by DTVO(I,J). That is, when the actual throttle opening TVO becomes not smaller than the reference value DTVO(I,J) as obtained according to the map shown in FIG. 4, the shift pattern is switched from the economy mode shift pattern to the power mode shift pattern. FIG. 6 shows the relation between the vehicle body acceleration $\Delta VSP$ and the reference value DTVO(I,J) when the vehicle speed is fixed. FIG. 7 shows the relation between the vehicle speed and the reference value DTVO(I,J) when the vehicle speed acceleration $\Delta VSP$ is fixed. As can be understood from FIG. 6, as the vehicle body acceleration $\Delta VSP$ increases, the reference value DTVO(I,J) decreases. That is, as the vehicle body acceleration $\Delta VSP$ increases, the shift pattern is more apt to be switched to the power mode shift pattern.

Figure 5:
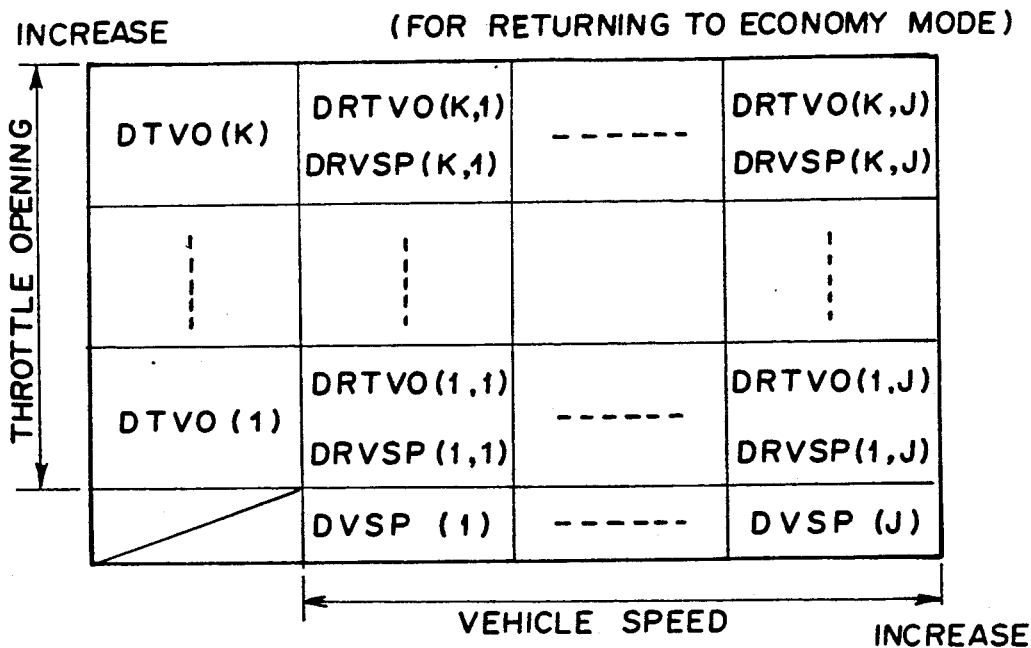
FIG. 5 is a map of reference values for returning the shift pattern to the economy mode shift pattern.
Figure 8:
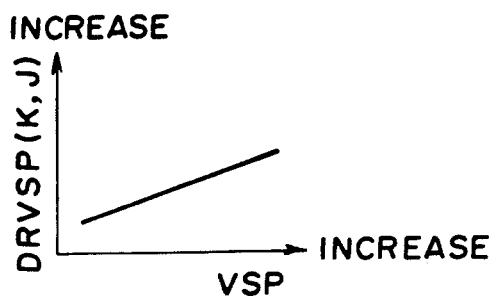
FIG. 8 shows the relation between the vehicle speed and the reference vehicle speed for return when the throttle opening is fixed.
Figure 9:
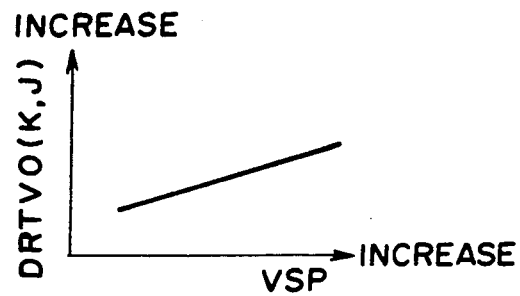
FIG. 9 shows the relation between the vehicle speed and the reference throttle opening for return when the throttle opening is fixed.
Figure 10:
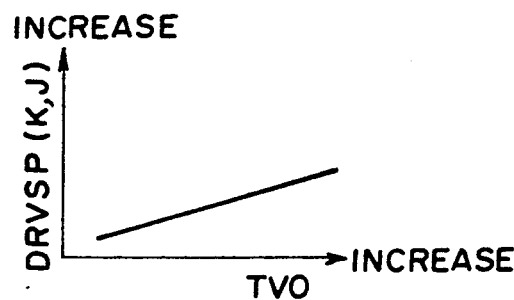
FIG. 10 shows the relation between the throttle opening and the reference vehicle speed for return when the vehicle speed is fixed.
Figure 11:
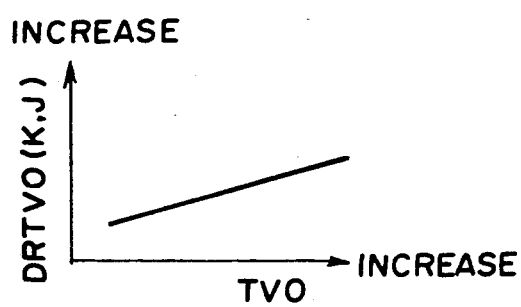
FIG. 11 shows the relation between the throttle opening and the reference throttle opening for return when the vehicle speed is fixed.

When the vehicle speed exceeds a predetermined reference speed for return and at the same time the throttle opening reduces below a predetermined reference opening for return, the shift pattern is switched from the power mode shift pattern to the economy mode shift pattern. The reference speeds for return and the reference openings for return are stored in the map shown in FIG. 5 in which the vehicle speed and the throttle opening are used as parameters. In FIG. 5, DVSP(J) (J 25 stands for 1, 2 ...) denotes the vehicle speed for searching the map and DTVO(K) (K stands for 1, 2 ...) denotes the throttle opening for searching the map. DRTVO(K,J) denotes the reference throttle opening for return and DRVSP(K,J) denotes the reference vehicle speed for return. FIG. 8 shows the relation between the vehicle speed VSP and the reference vehicle speed DRVSP(K,J) for return when the throttle opening is fixed. FIG. 9 shows the relation between the vehicle speed VSP and the reference throttle opening DRTVO(K,J) for return when the throttle opening is fixed. FIG. 10 shows the relation between the throttle opening TVO and the reference vehicle speed DRVSP(K,J) for return when the vehicle speed is fixed. FIG. 11 shows the relation between the throttle opening TVO and the reference throttle opening DRTVO(K,J) for return when the vehicle speed is fixed.

Figure 12A:
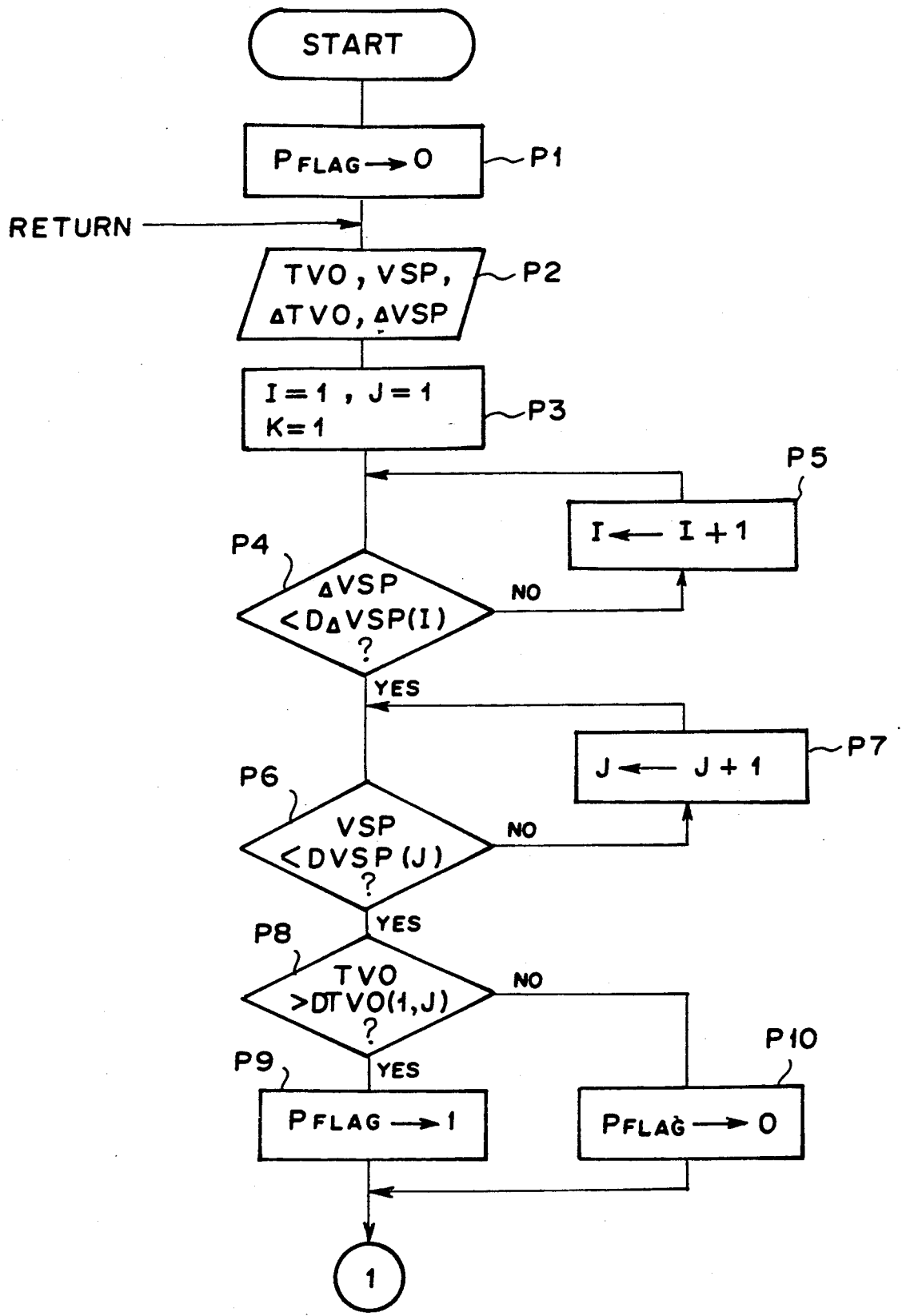
FIGS. 12A and 12B are flow charts for illustrating the control that the transmission control unit executes in a first embodiment of the present invention.

Now the control that the transmission control unit U executes will be described with reference to FIGS. 12A and 12B.

In step P1, the transmission control unit U resets P flag to 0. That the P flag is 1 means that the power mode has been selected, and that the P flag is 0 means that the economy mode has been selected.

In step P2, the transmission control unit U reads the throttle opening TVO and the vehicle speed VSP detected by the sensors 21 and 22, calculates the rate of change ΔTVO of the throttle opening TVO (by calculating the difference between the present value and the preceding value of the throttle opening TVO), and calculates the vehicle body acceleration ΔVSP by differentiating the vehicle speed VSP. Then in step P3, the transmission control unit U sets the respective addresses I, J and K in the maps shown in FIGS. 4 and 5 to 1.

In step P4, the transmission control unit U determines whether the actual vehicle body acceleration VSP is smaller than ΔVSP(I) in the map shown in FIG. 4. When the answer to the question in step P4 is NO, the transmission control unit U adds 1 to I in step P5 and then repeats step P4. In this manner, the transmission control unit U determines DΔVSP(I) in FIG. 4 corresponding to the present vehicle body acceleration ΔVSP. Similarly, the transmission control unit U determines DVSP(J) in FIGS. 4 and 5 corresponding to the present vehicle speed VSP. (steps P6 and P7)

In step P8, the transmission control unit U determines whether the present throttle opening TVO is larger than the reference value DTVO(I,J) corresponding to the values of DΔVSP(I) and DVSP(J). When the answer to the question in step P8 is YES, the transmission control unit U sets the P flag to 1 in step S9. Otherwise the transmission control unit U resets the P flag to 0 in step P10.

Figure 12B:
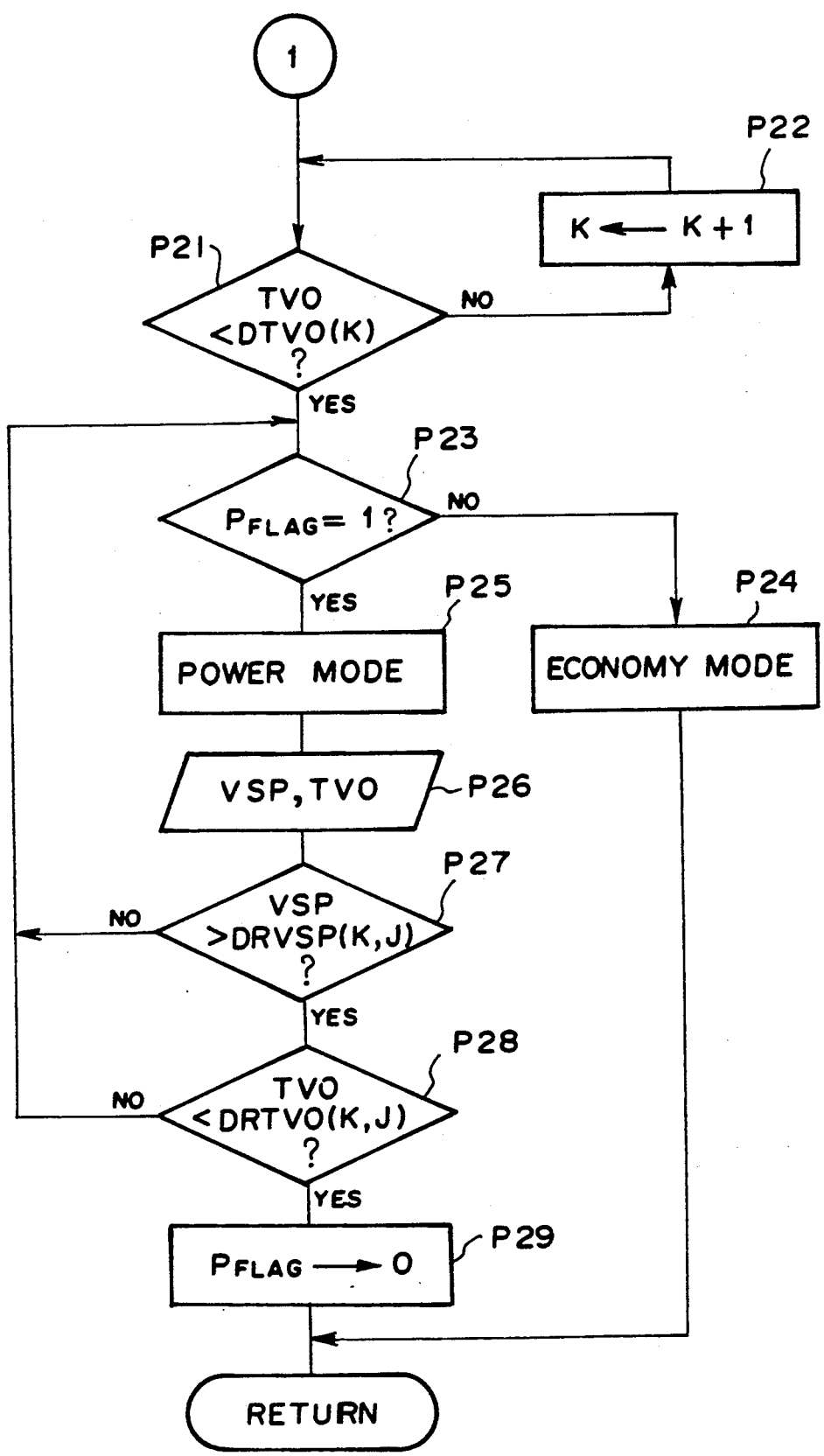

Thereafter, the transmission control unit U determines the DTVO(K) (FIG. 5) corresponding to the present throttle opening TVO in steps P21 and P22 in FIG. 12B. Then, when it is determined in step P23 that P flag is 0, the transmission control unit U controls the automatic transmission 2 according to the economy mode shift pattern. On the other hand, when it is determined in step P23 that P flag is 1, the transmission control unit U controls the automatic transmission 2 according to the power mode shift pattern.

In steps P26 to P29 after step P25, the transmission control unit U determines whether the shift pattern is switched to the economy mode shift pattern. That is, the transmission control unit U reads the present vehicle speed VSP and the present throttle opening TVO in step P26. The when it is determined in step P27 that the present vehicle speed VSP is higher than the reference vehicle speed DRVSP(K,J) for return (FIG. 5) and at the same time it is determined step P28 that the present throttle opening TVO is smaller than the reference value DRTVO(K,J) for return (FIG. 5), the transmission control unit U resets the P flag to 0 in step P29.

As the value for representing the engine load, the amount of depression of the accelerator pedal, the amount of intake air, the amount of fuel to be injected (particularly in the case of a diesel engine) or the like can be used instead of the throttle opening.

As the reference value for switching the shift pattern to the power mode shift pattern, the rate of change of the engine load, e.g., the rate of change of the throttle opening, can be used instead of the throttle opening [DTVO(I,J) in FIG. 4]. In this case, values of DΔTVO(I,J) which represent the rate of change of the throttle opening are stored instead of the values of DTVO(I,J), and it is determined in step P8 in the flow chart shown in FIG. 12A whether the present the value of ΔTVO is larger than DΔTVO(I,J). Though the value of DΔTVO(I,J) may decrease with increase in the vehicle body acceleration ΔVSP in the manner similar to that shown in FIG. 6, preferably it decreases with increase in the vehicle speed VSP.

Further, the reference value for switching the shift pattern to the power mode shift pattern may be increased with increase in the vehicle body acceleration ΔVSP unlike in the embodiment described above so that the accelerating performance is weakened.

Figure 14:
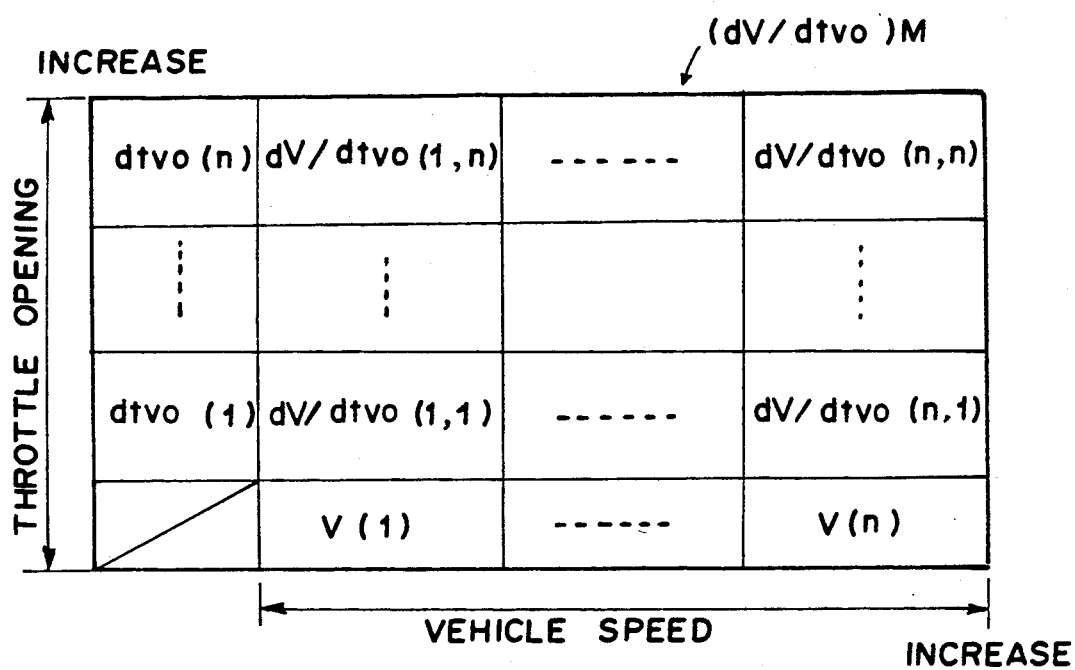
FIG. 14 is a map of the reference values employed in the second embodiment.

Another embodiment of the present invention will be described with reference to FIGS. 13 to 15, hereinbelow.

In this embodiment, the transmission control unit U switches the shift pattern from the economy mode shift pattern to the power mode shift pattern when the ratio of the acceleration of the vehicle body to the rate of change of the engine load becomes smaller than a predetermined reference value.

The control that the transmission control unit U executes in this embodiment will be described with reference to FIG. 13.

In FIG. 13, the transmission control unit U reads the throttle opening tvo, a correction coefficient α and the vehicle speed V in steps S1 to S3. The correction coefficient α is input into the transmission control unit U from a correcting setting means which is manually operated. Then the transmission control unit U calculates the throttle opening speed (i.e., the rate of change of the engine load) dtvo and the acceleration of the vehicle body dV. (steps S4 and S5) The transmission control unit U then calculates the ratio of the acceleration of the vehicle body dV to the throttle opening speed dtvo (dV/dtvo) in step S6. In step S7, the transmission control unit U reads a basic preset value (dV/dtvo)M from the map shown in FIG. 14 on the basis of the vehicle speed V and the throttle opening tvo read in steps S1 and S3. The transmission control unit U then multiplies the basic preset value (dV/dtvo)M by the correction coefficient α read in step S2 and obtains a preset value $(dV/dtvo)_o$. (step S8) In the map shown in FIG. 14, the value of the basic preset value (dV/dtvo)M decreases with increase in the throttle opening and the vehicle speed.

When the throttle opening speed dtvo is increasing (dtvo>0), i.e., when the accelerator pedal is being pushed down while the vehicle is running in the economy mode shift pattern, the transmission control unit U compares the ratio of the acceleration of the vehicle body dV to the throttle opening speed dtvo (dV/dtvo) calculated in step S6 with the preset value $(dV/dtvo)_o$, and when the former is smaller than the latter, the transmission control unit U switches the shift pattern to the power mode shift pattern. (steps S9 to S11)

For example, when the vehicle is running level road and the ratio of the acceleration of the vehicle body dV to the throttle opening speed dtvo (dV/dtvo) is larger than the preset value $(dV/dtvo)_o$, the transmission control unit U sets the shift pattern to the economy mode shift pattern. When the vehicle comes to an ascending slope and the driver accelerates the vehicle at the same throttle opening speed dtvo as that on level road, the acceleration of the vehicle body decreases. That is, when the accelerations of the vehicle body on ascending road and level road for a given throttle opening speed dtvo are respectively represented by dVT and dVH, the ratio of the acceleration of the vehicle body dV to the throttle opening speed dtvo on ascending road (dVT/dtvo) is smaller than that on level road (dVH/dtvo).

Figure 15:
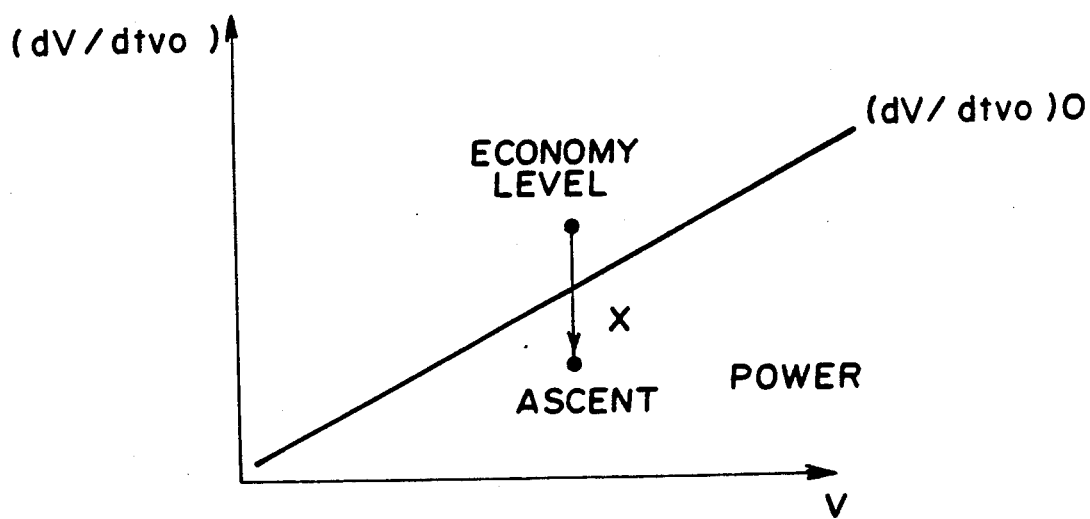
FIG. 15 is a view for illustrating the operation of the automatic transmission provided with the transmission control system in accordance with the second embodiment.

Accordingly, when the present value $(dV/dtvo)_o$ is set as shown in FIG. 15, the transmission control unit U switches the shift pattern to the power mode shift pattern at a lower vehicle speed when the vehicle comes to ascending road than when it is running level road as shown by arrow X in FIG. 15. Thus running of the vehicle comes to better follow the driver's will. On the other hand, when the vehicle comes to a descending slope and the driver accelerates the vehicle at the same throttle opening speed dtvo as that on level road, the acceleration of the vehicle body increases. That is, when the accelerations of the vehicle body on descending road and level road for a given throttle opening speed dtvo are respectively represented by dVT and dVK, the ratio of the acceleration of the vehicle body dV to the throttle opening speed dtvo on descending road (dVK/dtvo) is larger than that on level road (dVH/dtvo).

Accordingly, the transmission control unit U switches the shift pattern to the power mode shift pattern at a higher vehicle speed when the vehicle comes to descending road . Unnecessary switching of the shift pattern is avoided. Similarly when the load on the vehicle is heavy, the transmission control unit U switches the shift pattern to the power mode shift pattern at a lower vehicle speed than when the load on the vehicle is light.

When it is determined in step S10 that the ratio of the acceleration of the vehicle body dV to the S6 is not smaller than the preset value $(dV/dtvo)_o$, the transmission control unit U does not switch the shift pattern.

When it is determined in step S9 that the throttle opening speed dtvo is decreasing (dtvo <0), i.e., that the accelerator pedal is being released while the vehicle is running in the power mode shift pattern, the transmission control unit U compares the throttle opening speed dtvo with a preset value $(dtvo)_o$, and when the former is smaller than the latter, the transmission control unit U switches the shift pattern to the economy mode shift pattern. Otherwise, the transmission control unit U does not switch the shift pattern and returns to step S1. (steps S9 to S13)

Figure 16:
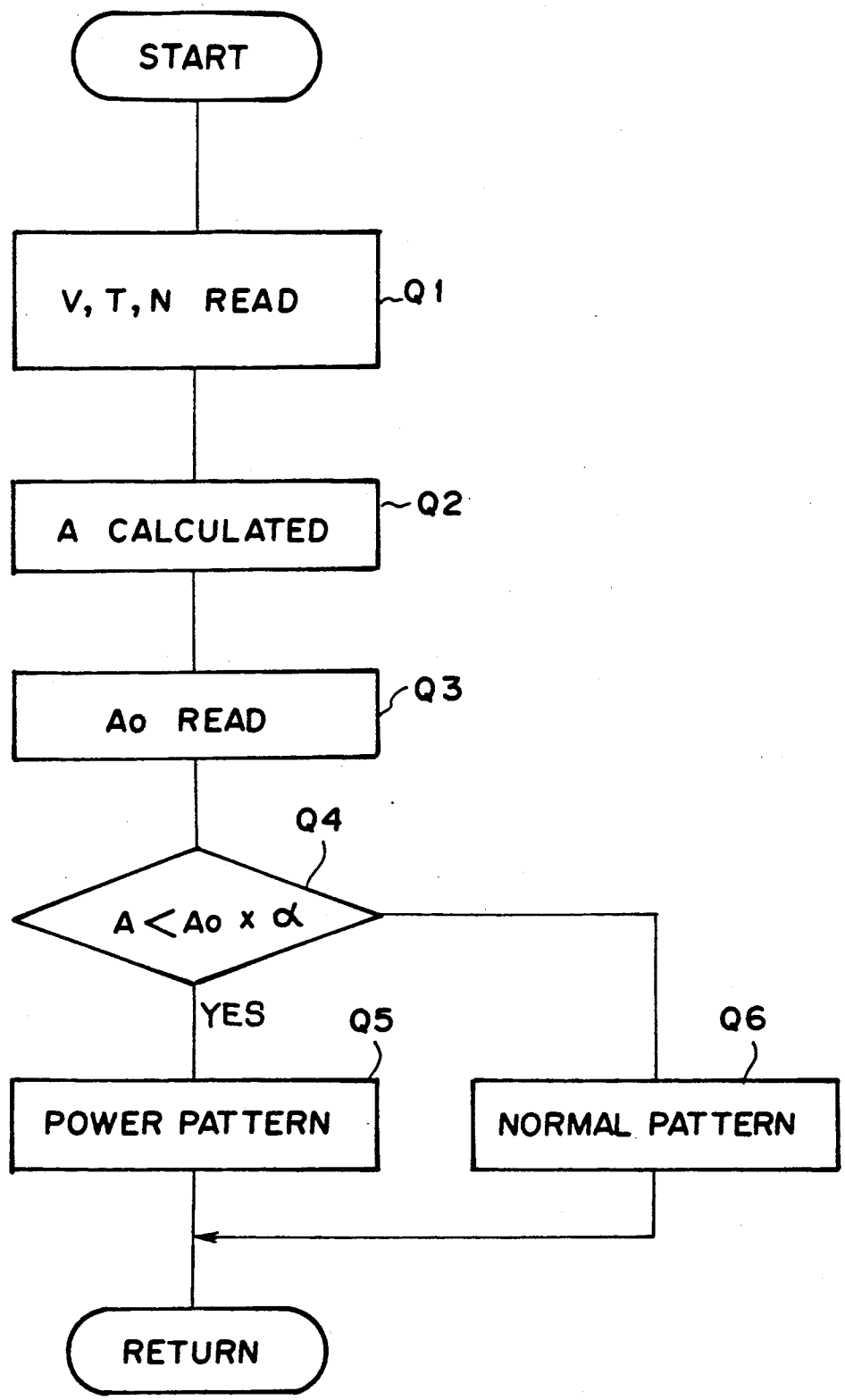
FIG. 16 is a flow chart for illustrating the control that the transmission control unit executes in a third embodiment of the present invention.
Figure 17:
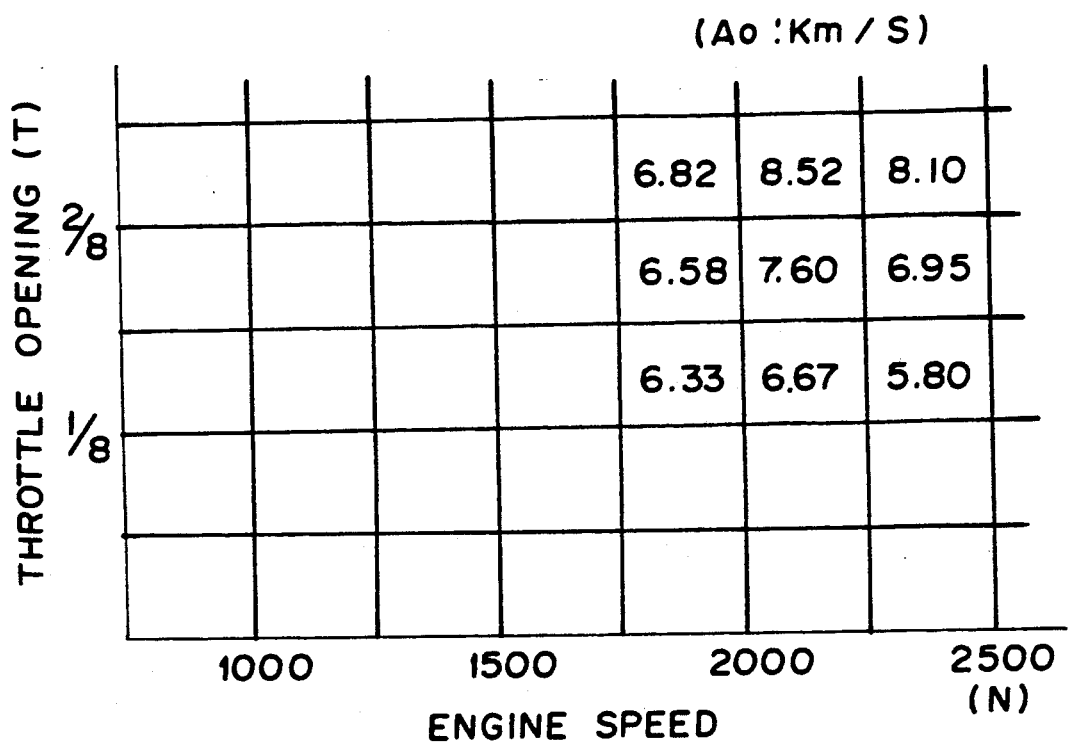
FIG. 17 is a map of the reference accelerations.

Still another embodiment of the present invention will be described with reference to FIGS. 16 and 17, hereinbelow.

In this embodiment, the transmission control unit U switches the shift pattern from the economy mode shift pattern to the power mode shift pattern when the running load is larger than a preset value.

The control that the transmission control unit U executes in this embodiment will be described with reference to FIG. 16. In FIG. 16, the transmission control unit U first reads the vehicle speed V, the throttle opening T and the engine speed N. (step Q1) Then the transmission control unit U calculates in step Q2 the acceleration of the vehicle body A, i.e., the rate of change with time of the vehicle speed V. Further the transmission control unit U reads from the map shown in FIG. 17 a reference acceleration Ao for the throttle opening T and the engine speed N read in step Q1. The reference acceleration Ao is an acceleration of the vehicle body which is obtained when the vehicle runs level road at a given engine speed and throttle opening, and values of the reference acceleration Ao for various throttle openings and engine speeds have been stored in the map.

Then the transmission control unit U compares the actual acceleration A calculated in step Q2 with the reference acceleration Ao, and when the former is smaller than a predetermined proportion u (e.g., 85%) of the latter $(A < Ao \times \alpha)$, the transmission control unit U determines that the running load acting on the vehicle is excessively large and switches the shift pattern to the power mode shift pattern. (steps Q4 and Q5) Otherwise, the transmission control unit U selects the economy mode shift pattern.

We claim:

1. A transmission control system for an automatic transmission for a vehicle which causes the automatic transmission to shift according to one of first and second shift patterns, the transmission being caused to upshift into a given gear-speed at a lower vehicle speed according to said first shift pattern than according to said second shift pattern, the control system comprising:

an engine load sensor which detects load on an engine of the vehicle, an acceleration determining means for determining acceleration of the vehicle body, and a shift pattern switching means which switches the shift pattern between the first and second shift patterns on the basis of a combination of a function of the engine load and a function of the acceleration of the vehicle body;

wherein said shift pattern switching means switches the shift pattern from the first shift pattern to the second shift pattern when the engine load becomes not smaller than a predetermined reference value, and changes the predetermined reference value according to the acceleration of the vehicle body.

2. A transmission control system as defined in claim 1 in which said engine load sensor detects the engine load through the throttle opening.

3. A transmission control system for an automatic transmission for a vehicle which causes the automatic transmission to shift according to one of first and second shift patterns, the transmission being caused to upshift into a given gear-speed at a lower vehicle speed according to said first shift pattern than according to said second shift pattern, the control system comprising:

an engine load sensor which detects load on an engine of the vehicle, an acceleration determining means for determining acceleration of the vehicle body, and a shift pattern switching means which switches the shift pattern between the first and second shift patterns on the basis of a combination of a function of the engine load and a function of the acceleration of the vehicle body;

wherein said shift pattern switching means switches the shift pattern from the first shift pattern to the second shift pattern when the rate of change of the engine load becomes not smaller than a predetermined reference value, and changes the predetermined reference value according to the acceleration of the vehicle body.

4. A transmission control system as defined in claim 3 in which said engine load sensor detects the engine load through the throttle opening.

5. A transmission control system for an automatic transmission for a vehicle which causes the automatic transmission to shift according to one of first and second shift patterns, the transmission being caused to upshift into a given gear-speed at a lower vehicle speed according to said first shift pattern than according to said second shift pattern, the control system comprising:

an engine load sensor which detects load on an engine of the vehicle, an acceleration determining means for determining acceleration of the vehicle body, and a shift pattern switching means which switches the shift pattern between the first and second shift patterns on the basis of a combination of a function of the engine load and a function of the acceleration of the vehicle body;

wherein said shift pattern switching means switches the shift pattern from the first shift pattern to the second shift pattern when the ratio of the acceleration of the vehicle body to rate of change of the engine load becomes smaller than a predetermined reference value.

6. A transmission control system as defined in claim 5 in which said shift pattern switching means changes the reference value according to the throttle opening and the vehicle speed.

7. A transmission control system for an automatic transmission for a vehicle which causes the automatic transmission to shift according to one of first and second shift patterns, the transmission being caused to upshift into a given gear-speed at a lower vehicle speed according to said first shift pattern than according to said second shift pattern, the control system comprising:

an engine load sensor which detects load on an engine of the vehicle.

an acceleration determining means determining acceleration of the vehicle body, and a shift pattern switch means which switches the shift pattern between the first and second shift patterns on the basis of a combination of a function of the engine load and a function of the acceleration of the vehicle body;

the transmission control system further comprising a reference value output means which outputs a reference value of acceleration of the vehicle body according to the throttle opening, and a running load determining means which compares the actual acceleration of the vehicle body with the reference value output by the reference value output means and determines a running load according to the result of the comparison and in which said shift pattern switching means switches the shift pattern from the first shift pattern to the second shift pattern when the running load is larger than a preset value.

8. A transmission control system as defined in claim 7 further including means to detect engine speed, wherein said reference value is changed depending on both the throttle opening and the engine speed.

* * * * *